United States Patent [19]

Haskell

[11] 3,716,511
[45] Feb. 13, 1973

[54] COATING COMPOSITION OF AN AQUEOUS DISPERSION OF COPOLYMERIC VINYLIDENE CHLORIDE

[75] Inventor: Vernon Charles Haskell, Richmond, Va.

[73] Assignee: E. I. du Pont de Nemours and Company, Wilmington, Del.

[22] Filed: Dec. 8, 1970

[21] Appl. No.: 96,293

[52] U.S. Cl..260/29.6 RB, 260/29.6 RW, 260/29.6 TA, 260/29.6 MN, 260/29.6 ME, 260/32.6 R, 260/33.4 R, 117/138.8 E, 117/138.8 F
[51] Int. Cl............................C08f 29/14, C08f 45/44
[58] Field of Search....... 260/29.6 TA, 29.6 RB, 29.6 RW, 260/29.6 MN, 29.6 ME, 32.6 R, 33.4 R

[56] References Cited

UNITED STATES PATENTS

| | | | |
|---|---|---|---|
| 2,961,340 | 11/1960 | Meier | 260/29.6 TA |
| 3,048,496 | 8/1962 | Buechler et al. | 260/29.6 TA |
| 3,108,017 | 10/1963 | Messwarb et al. | 260/29.6 TA |
| 3,170,888 | 2/1965 | Kutik et al. | 260/29.6 TA |
| 3,271,345 | 9/1966 | Nadeau et al. | 260/29.6 TA |
| 3,309,330 | 3/1967 | Settlage | 260/29.6 TA |
| 3,362,841 | 1/1968 | Menikheim et al. | 260/29.6 TA |
| 3,427,276 | 2/1969 | Hahn et al. | 260/29.6 MN |

*Primary Examiner*—William H. Short
*Assistant Examiner*—L. M. Phynes
*Attorney*—Donald W. Huntley

[57] ABSTRACT

A coating composition comprising a dispersion of copolymer of vinylidene chloride wherein the copolymer is of between about 60 parts and about 95 parts by weight of vinylidene chloride in a dispersion medium of alcohol and a nitrogenous base; and a process for coating film structures of organic thermoplastic polymeric material characterized by applying the coating composition to a film structure and thereafter drying the coated film structure.

7 Claims, No Drawings

3,716,511

COATING COMPOSITION OF AN AQUEOUS DISPERSION OF COPOLYMERIC VINYLIDENE CHLORIDE

BACKGROUND OF THE INVENTION

Coating compositions of vinyl polymers and copolymers are known to be useful for coating base film structures such as transparent regenerated cellulose. To illustrate, U.S. Pat. No. 2,570,478 describes the coating of flexible and transparent regenerated cellulose film structures with copolymer compositions of vinylidene chloride, acrylonitrile and itaconic acid. Such laminar or coated film structures are desirable for use as packaging materials because of their unique combination of physical properties such as heat sealability and good water, gas, and grease barrier performance. Representative known coating compositions are characterized by vinylidene chloride copolymer aqueous dispersions with ionic surfactants. While these dispersions are quite satisfactory for many purposes, they tend to fail when used as coatings in moist atmospheres, lacking adhesion to the base film structure when under conditions of high relative humidity or where the resulting film structure is to be used as a wrapping for articles such as candy which have a high moisture content.

Previous efforts to adhere polymeric coatings of vinylidene chloride to base film structures such as regenerated cellulose have included the application of an anchoring subcoating to the base film structures followed by applying the vinylidene chloride polymeric coating to the anchoring subcoating. Other efforts involved incorporating a reactive water soluble resin into the base film structure during its manufacture. For example, resins such as cationic ureaformaldehyde or melamine-formaldehyde resins have been incorporated in the base film structure at the softener bath stage in the manufacture of the regenerated cellulose base sheet. The latter is largely undesirable because it is difficult to control the concentration of the resin that is incorporated into the regenerated cellulose base film, and furthermore, the resin on the surface of the gel film tends to adhere to the surface of the drying rolls during the drying operation leading to non-uniform drying of the base sheet. Thus, the results of prior efforts to adhere polymerized vinylidene chloride coating compositions to base film structures such as those of regenerated gel cellulose have not proven entirely satisfactory. Additionally, the preparation of aqueous vinylidene chloride polymer dispersions in the absence of a surfactant results in dispersions which tend to be unstable. Even the best of such dispersions have shortcomings with respect to their resistance to moist atmospheres.

The application of vinylidene chloride copolymer coatings to polymeric film from solutions of the copolymer in organic solvents has serious disadvantages. The copolymer contents in the solutions are not very concentrated; the solvents are not very volatile and require long drying times and/or high drying temperatures; thick coatings (e.g. barrier coatings on cellophane) are not feasible because of solvent retention; and, particularly in the case of polyolefin films, the solvent attacks the base film causing polymer deorientation and even longer drying times. The development of aqueous dispersions of these polymers has enabled the use of more concentrated coating baths and eliminated the attack on the base film. However, these baths also have certain disadvantages. The low volatility of water continues the requirement of long drying times and/or high drying temperatures; the high temperatures now required for coating coalescence deorient the base film; and coating adhesion in moist atmospheres is poor.

SUMMARY OF THE INVENTION

The present invention provides improved coating compositions comprising copolymers of vinylidene chloride that are especially useful for coating polymeric base film structures.

Specifically, there is provided a composition comprising a dispersion of a copolymer of vinylidene chloride and at least one other ethylenically unsaturated monomer copolymerizable therewith in a dispersion medium of alcohol and a nitrogenous base. The composition of the invention preferably comprises a dispersion of a copolymer obtained from at least about 65 parts by weight of vinylidene chloride between about 5 parts and about 35 parts by weight of at least one other ethylenically unsaturated monomer copolymerizable therewith in a dispersion medium of methanol and ammonia.

According to the present invention, there also is provided a method or process of manufacture for coating base film structures which comprises applying to at least one surface of a base film structure a coating composition comprising a dispersion of a copolymer of vinylidene chloride and at least one other ethylenically unsaturated monomer copolymerizable therewith in a dispersion medium of alcohol and a nitrogenous base, and thereafter drying said coated base film structure. The coated base film structure is preferably dried at a temperature between about 120° C. and about 140° C.

According to the present invention there is further provided a moisture-resistant and heat-sealable film structure comprising a polymeric base film having firmly adhered to at least one surface thereof a coating derived from a composition comprising a dispersion of a copolymer of vinylidene chloride and at least one other ethylenically unsaturated monomer copolymerizable therewith in a dispersion medium of alcohol and a nitrogenous base. The moisture-resistant and heat-sealable film structure of the present invention preferably comprises a base layer of polymeric material selected from polypropylene, polyethylene terephthalate and cellophane having firmly adhered to at least one surface thereof a coating derived from a composition comprising a dispersion of a copolymer obtained from between about 60 and about 95 parts by weight of vinylidene chloride, between about 5 and 20 parts by weight of ethyl acrylate, between about 5 and 20 parts by weight of methyl methacrylate or acrylonitrile, between about 3 and about 8 parts by weight of acrylic acid or itaconic acid, in a dispersion medium of methyl or ethyl alcohol and ammonia.

DESCRIPTION OF THE PREFERRED EMBODIMENTS

The composition of the present invention is comprised of a plurality of components. One essential component thereof is a copolymer obtained from vinylidene chloride and at least one other ethylenically unsaturated monomer copolymerizable therewith. The copolymer of vinylidene chloride preferred for purposes of the invention contains between about 60 and 95 parts by weight of vinylidene chloride, and between about 5 and 40 parts of one or more ethylenically unsaturated monomers copolymerizable therewith. Representative mono-olefinic monomers copolymerizable with vinylidene chloride include, for example, acrylic acid, methyl, ethyl isobutyl, butyl, octyl and 2-ethyl hexyl acrylates and methacrylates; phenyl methacrylate, cyclohexyl methacrylate, p-cyclohexylphenyl methacrylate, methoxyethyl methacrylate, chloroethyl methacrylate, 2-nitro-2-methylpropyl methacrylate and the corresponding esters of acrylic acid; methyl alpha-chloroacrylate, octyl alpha-chloroacrylate, methyl isopropenyl ketone; acrylonitrile, methacrylonitrile, methyl vinyl ketone, vinyl chloride; vinyl acetate; vinyl propionate; vinyl chloroacetate; vinyl bromide; styrene; vinyl naphthalene; ethyl vinyl ether; N-vinyl phthalimide; N-vinyl succinimide; N-vinyl carbazole; isopropenyl acetate; acrylamide; methacrylamide and alkyl substitution products thereof; phenyl vinyl ketone; diethyl fumarate; diethyl maleate; methylene diethyl malonate; dichlorovinylidene fluoride; itaconic acid; dimethyl itaconate; diethyl itaconate; dibutyl itaconate; vinyl pyridine; maleic anhydride; allyl glycidyl ether and other unsaturated aliphatic ethers described in U.S. Pat. No. 2,160,943. The monomers may be generally defined as vinyl or vinylidene having a single $CH_2=C$ grouping. The most useful monomers falls within the general formula

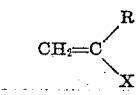

where R may be hydrogen, halogen, or saturated aliphatic radical, and X is a member of the group consisting of —Cl, —Br, —F, —CN, —$C_6H_5$, —COOH,

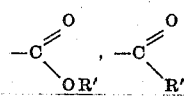

—CH=O, —$OC_6H_5$, —$CONH_2$, —CONH-R' and —$CONR'_2$ in which R' is alkyl.

Another essential component of the composition of the present invention is a dispersion medium of alcohol and a nitrogenous base. The alcohol and the nitrogenous base may be present in any desired amount. The amount of nitrogenous base employed is that which is necessary to provide a slight stoichiometric excess of base over the acid present in the copolymer. Suitable alcohols include methyl, ethyl, or isopropyl alcohol. Suitable nitrogenous bases include ammonia, pyridine; amines such as methyl, ethyl and propylamine or corresponding dialkyl amines.

A preferred embodiment of the composition of the present invention comprises dispersion of a copolymer of 60 to 95 parts by weight of vinylidene chloride, about 3 to 8 parts by weight of a member selected from the group consisting of acrylic acid and itaconic acid, about 5 to 20 parts by weight of ethyl acrylate, about 5 to 20 parts by weight of a member of the group consisting of methyl methacrylate and acrylonitrile, in a dispersion medium of ethyl or methyl alcohol and ammonia.

The vinylidene chloride content in the copolymeric composition may range from 60 to 95 percent by weight, preferably from 65 to 85 percent. Ethyl acrylate content may range from 5 to about 20 weight percent, with the range of 7 to 15 percent being preferred. Acrylic acid, when a component of the copolymer, may range from 3 to 8 weight percent, and is a preferred component when the coating composition is to be used on polyolefin films such as polypropylene. Acrylic acid may be replaced by itaconic acid for coating of some films such as those of polyalkylene terephthalates or isophthalates and regenerated cellulose.

The coating dispersions of the invention are applied to base film structures, i.e., self-supporting film structures, of polyolefins such as polyethylene and polypropylene; polyalkylene terephthalates and isophthalates, polyamides, polystyrenes, regenerated cellulose, cellulose derivatives such as cellulose acetate, ethyl cellulose and hydroxyethyl cellulose as well as on paper and paper products. In the case of plastic films, their surfaces may be treated for adherability by flame treatment, electrical discharge, chlorination, treatment with ultraviolet light, chemical treatment and combinations of certain of these treatments, all as is well known in the art.

The vinylidene chloride aqueous copolymer dispersions of this invention are made by copolymerizing the monomers employing a typical Redox initiator system such, for example, as ammonium persulfate/sodium bisulphite. Other well known systems can be used as well. In making the preferred dispersions an aqueous solution of the initiator system and a non-ionic surfactant are placed in the reaction vessel. Then the copolymerizable monomers are slowly fed to the reaction zone. Once the polymerization reaction has begun (which is essentially immediate), the reacting monomers are introduced continuously in a ratio fixed by the composition desired in the final copolymer and at such a rate that a uniform polymerization rate is obtained. Typically, about 0.25 to 4 percent of the total quantity of monomers to be copolymerized is added to the initiator system each minute until the addition has been completed.

The polymerization process is conveniently carried out at atmospheric pressure but superatmospheric pressure can as well be used. While generally elevated temperatures may be used, preferably the refluxing temperature of the vinylidene chloride-monomer mixture, that is around 38°—40° C., is employed. The polymerizations may also be carried out at autogenous pressure at elevated temperatures. The essential feature is that the copolymer dispersions must be produced by continuous addition of the monomers to the reaction vessel containing the initiator system, and other parameters of the polymerization can be adapted from the prior art as suits the convenience of the operator.

The initiator system used in the process of the invention, except for the inclusion of the non-ionic surfactant, can be any of those now known to the art. A suitable system is composed of ammonium persulfate, sodium metabisulfite and ferrous ammonium sulfate. These materials are used as a 0.1 to 2 percent aqueous solution. Other components which could be employed include potassium persulfate, sodium periodate or hydrogen peroxide with reducing agents such as ferrous and cuprous compounds, sulfur compounds, various reducing sugars or levulinic acid.

According to the present invention there is further provided a moisture-resistant and heat-sealable film structure comprising a base film such as, for example, polypropylene, regenerated cellulose, etc., having firmly adhered to at least one surface thereof a coating comprising the composition described hereinabove. The base film is coated with the above described composition by any convenient coating technique. Base films of regenerated cellulose may be prepared in accordance with the method described in U.S. Pat. Nos. 1,548,864 and 1,601,289 utilizing viscose casting techniques as described in any of U.S. Pat. Nos. 2,862,245; 3,073,733; 2,962,766; 3,050,775 and 2,254,203. The gel regenerated cellulose film so produced may be dried by passing the film over and in contact with a series of heated rolls in a heated chamber, as described in any of U.S. Pat. Nos. 2,000,079; 2,141,277; 2,746,166 and 2,746,167. The dried regenerated cellulose films so prepared contain usually about 5 percent to about 30 percent by weight, based upon the total weight of the cellulosic film, of a propylene glycol, and optionally between about 1 percent and about 10 percent by weight, based upon the total weight of the cellulosic film, of glycerol.

The principle and practice of the present invention will now be illustrated by the following Examples which are provided to show the practice and use thereof, but it is not intended that the invention be limited thereto since modifications in technique and operation will be apparent to anyone skilled in the art. All parts and percentages in the following Examples are by weight unless otherwise indicated.

The test samples of coated base film prepared in the following Examples were evaluated for heat-seal strength in accordance with the following testing procedure:

HEAT-SEAL STRENGTH is measured by cutting a piece of coated film, 4 × 10 in., into two pieces, 4 × 5 in. each, with the long direction being in the direction of polymer extrusion (the machine direction). The two pieces are then superimposed so that the coated surfaces are in contact. The two pieces of superimposed film are then sealed together at each end at right angles to the machine direction axis. For these tests, the films are sealed using a pressure of 5 p.s.i. for a 0.25 second dwell time and at the specified temperature. The sealed sheets are then cut in half at right angles to the machine direction axis. From the center of the resulting pieces, one inch wide strips parallel to the machine axis are cut. These are conditioned at 75° F. for one day, and 35 percent and 81 percent relative humidity, respectively, and then tested by placing the free ends of the strips in a Suter Tester Machine and pulling them apart. The highest force in grams required to pull the strips apart is taken as a measure of the heat-seal bond strength.

EXAMPLE 1

An aqueous surfactant solution containing 2 percent Tween 60 (a sorbitan monostearate) is added to a reactor to provide a solution containing 1 part surfactant. One hundred twenty-five parts of water are added so that the final solids content in the reactor, including copolymer, will be approximately 37 percent. This mixture together with an initiator system of 0.3 part of ammonium persulfate, 0.3 part of sodium metabisulfite and 7.5ppm. of ferrous ammonium sulfate are stirred under nitrogen in the reactor at approximately 40° C. Thereafter, a mixture of monomers consisting of 70 parts vinylidene chloride, 10 parts ethyl acrylate, 15 parts methyl methacrylate and 5 parts acrylic acid are added continuously over a period of about 2 hours. Reaction begins almost immediately. A steady refluxing of the reaction mixture is maintained and the temperature is held at approximately 40° C. The resulting dispersions contain approximately 37 percent solids, almost all of which is the 70/10/15/5 copolymer. This is the initial water dispersion coating bath.

Thirty grams of the initial water dispersions are stirred into a mixture of 15 ml. of ethyl alcohol and 15 ml. of 29 percent, by weight, aqueous ammonia solution. The resulting mixture is also a stable dispersion. Biaxially oriented polypropylene and polyethylene terephthalate films and cellophane films are coated with this mixture and dried in a radiant heating coating tower. The coatings dry rapidly and coalesce easily. The coating weights are 3.8, 2.7 and 5.5 g/m² respectively. The strengths of representative heat seals made at 125° C. are 368.94 and 324 grams/in.

EXAMPLE 2

Example 1 is repeated, except that the coated film is dried in a heated air dryer. Good drying and coalescence are obtained at dryer temperatures of 120°–160° C. at speeds of 40 fpm.

A control sample is prepared by coating biaxially oriented polypropylene with the initial water dispersion of Example 1 to give a coating weight of about 3.8 g/m². The coating fails to coalesce at 170° C., the highest temperature of the air dryer and 25 fpm, the lowest rate of the apparatus.

EXAMPLE 3

Thirty grams of the initial water dispersion of Example 1 are stirred into a mixture of 20 ml. of ethyl alcohol and 10 ml. of a 10 percent by weight aqueous ethyleneimine solution. The resulting mixture is also a stable dispersion. Biaxially oriented polypropylene film and cellophane film are coated with this mixture and dried as in Example 1. The coating dries rapidly and coalesces easily. Coating weights are 5.4 and 3.7 g/m² respectively. The coated polypropylene film is boiled in eater for 10 minutes. The strength of the 125° C. heat seal is still 298 g/in., demonstrating good coating adhesion in moist conditions.

EXAMPLE 4

The initial water dispersion of Example 1 is frozen and thawed to recover solid polymer. Polymer is removed by filtration, washed with cold $H_2O$ and dried at room temperature to a free flowing powder. Eight hundred grams of this powder are dispersed in a mixture of 3 liters of methyl alcohol and 200 ml. of 29 8.2 percent aqueous ammonia solution to form a stable dispersion. Flame treated, biaxially oriented polypropylene film is coated with this dispersion and dried as in Example 1. The coatings dry rapidly and coalesce readily. Table I shows the coating weights and the strengths of the heat seals under conditions of differing moisture.

TABLE I

| Coating Weight g/m² | Heat Seal 35% R.H. | g./in. 81% R.H. |
|---|---|---|
| 6.4 | 329 | 434 |
| 9.7 | 420 | 540 |
| 9.5 | 392 | 783 |
| 8.2 | 410 | 427 |
| 9.9 | 393 | 532 |

Films coated with the composition of this invention are useful for packaging applications, particularly products of high moisture content, such as foodstuffs, candy, bakery goods, tobacco and the like. Such films can be laminated to metal foils and other films such as polymer coated cellophane and coated thermoplastic films. Such structures can be made by thermal lamination or by use of appropriate adhesives, such as the dextrine, natural and synthetic rubber latices and heat activated waxes and wax combinations with resins such as ethylene/vinyl acetate.

What is claimed is:

1. A composition comprising an aqueous dispersion of copolymer of vinylidene chloride and at least one other ethylenically unsaturated monomer copolymerizable therewith in a dispersion medium of at least one alcohol selected from methanol, ethanol and isopropanol and at least one nitrogenous base selected from ammonia; pyridine; amines selected from methyl amine, ethyl amine, and propylamine and their corresponding dialkyl amines; and ethyleneimine, the nitrogenous base being present in an amount to provide a stoichiometric excess of the base over the acid present in the copolymer.

2. A composition of claim 1 wherein the copolymer is obtained from between about 65 parts and about 95 parts by weight of vinylidene chloride, and between about 5 parts and about 35 parts by weight of said other ethylenically unsaturated monomer.

3. A composition of claim 2 wherein the ethylenically unsaturated monomer comprises at least one acrylonitrile and methyl methacrylate.

4. A composition of claim 3 wherein the monomer additionally comprises monomer selected from acrylic acid and itaconic acid.

5. A composition of claim 4 wherein the alcohol is selected from ethyl alcohol and methyl alcohol.

6. A composition of claim 5 wherein the nitrogenous base is ammonia.

7. A coating composition comprising an aqueous dispersion of a copolymer of 60 to 95 parts by weight of vinylidene chloride, about 5 to 20 parts by weight of ethyl acrylate, about 5 to 20 parts by weight of a member of the group consisting of methyl methacrylate and acrylonitrile, about 3 to 8 parts by weight of an unsaturated organic acid of the group consisting of acrylic acid and itaconic acid, in a dispersion medium of an alcohol selected from the group consisting of methyl alcohol, ethyl alcohol and isopropyl alcohol, and a nitrogenous base selected from the class consisting of ammonia, methylamine, ethylamine and propylamine.

* * * * *